US010540065B2

(12) United States Patent
Shankar et al.

(10) Patent No.: US 10,540,065 B2
(45) Date of Patent: *Jan. 21, 2020

(54) METADATA DRIVEN DIALOGS

(71) Applicant: Microsoft Technology Licensing, LLC, Redmond, WA (US)

(72) Inventors: Anusha Shankar, Woodinville, WA (US); Bharath Swaminathan, Renton, WA (US); Zhi J. Zhao, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/822,863

(22) Filed: Nov. 27, 2017

(65) Prior Publication Data

US 2018/0081516 A1    Mar. 22, 2018

Related U.S. Application Data

(63) Continuation of application No. 14/312,979, filed on Jun. 24, 2014, now Pat. No. 9,857,947.

(60) Provisional application No. 61/947,165, filed on Mar. 3, 2014.

(51) Int. Cl.
*G06F 3/0484* (2013.01)
*G06F 8/38* (2018.01)
*G06F 9/451* (2018.01)

(52) U.S. Cl.
CPC .............. *G06F 3/0484* (2013.01); *G06F 8/38* (2013.01); *G06F 9/451* (2018.02)

(58) Field of Classification Search
CPC ........... G06F 3/0484; G06F 9/451; G06F 8/38
See application file for complete search history.

(56) References Cited

U.S. PATENT DOCUMENTS

| 7,487,440 B2 | 2/2009 | Gergic et al. |
| 8,407,576 B1* | 3/2013 | Yin ....................... G06F 3/0481 715/206 |
| 8,711,377 B2* | 4/2014 | Negishi ................. G06F 3/1208 358/1.13 |
| 2003/0221165 A1* | 11/2003 | Young ...................... G06F 8/38 715/222 |
| 2006/0136832 A1 | 6/2006 | Keller et al. |
| 2007/0074121 A1* | 3/2007 | Mullender .............. G06F 9/451 715/744 |
| 2007/0130205 A1* | 6/2007 | Dengler ................. G06F 9/451 |

(Continued)

FOREIGN PATENT DOCUMENTS

WO    2013042116 A1    3/2013

OTHER PUBLICATIONS

"Dialogs in Dynamics CRM 2013", Retrieved From https://msdynamicscrmblog.wordpress.com/2013/12/02/dialogs-in-dynamics-crm-2013/, Dec. 2, 2013, 10 pages.

(Continued)

*Primary Examiner* — David E Choi
(74) *Attorney, Agent, or Firm* — Christopher J. Volkmann; Kelly, Holt & Christenson, PLLC

(57) ABSTRACT

Dialog metadata is used to generate a metadata driven dialog definition. The metadata can define logic that is run on the dialog, and customizations to the dialog are made by modifying the dialog metadata.

20 Claims, 20 Drawing Sheets

(56) References Cited

U.S. PATENT DOCUMENTS

| | | | |
|---|---|---|---|
| 2007/0168413 A1* | 7/2007 | Barletta | G06F 3/04883 709/203 |
| 2008/0104540 A1 | 5/2008 | Sawyer | |
| 2008/0127220 A1* | 5/2008 | Morris | G06F 9/45512 719/320 |
| 2008/0201648 A1* | 8/2008 | Earp | G06F 9/451 715/762 |
| 2008/0222630 A1 | 9/2008 | Taylor et al. | |
| 2008/0250313 A1* | 10/2008 | Kamdar | G06F 9/451 715/700 |
| 2009/0138789 A1* | 5/2009 | Tangen | G06F 16/258 715/213 |
| 2012/0150751 A1 | 6/2012 | Pandey et al. | |
| 2014/0013234 A1* | 1/2014 | Beveridge | G06F 3/0484 715/740 |
| 2014/0237424 A1* | 8/2014 | Lee | G06F 3/0482 715/809 |
| 2015/0058708 A1* | 2/2015 | Georgiev | G06F 17/248 715/202 |
| 2015/0121193 A1* | 4/2015 | Beveridge | G06F 17/2247 715/234 |
| 2015/0143209 A1* | 5/2015 | Sudai | G06F 17/248 715/202 |
| 2015/0178099 A1* | 6/2015 | Diester | G06F 8/20 715/762 |
| 2015/0248202 A1* | 9/2015 | Shankar | G06F 3/0484 715/808 |

OTHER PUBLICATIONS

"Oracle Application Development Framework Overview", in Oracle White Paper, Jun. 2011, 13 Pages "Applicant Initiated Interview Summary Issued in U.S. Appl. No. 14/312,979", dated Oct. 17, 2016, 3 Pages.

"Final Office Action Issued in U.S. Appl. No. 14/312,979", dated Nov. 28, 2016, 36 Pages.

"Non Final Office Action Issued in U.S. Appl. No. 14/312.979", dated Mar. 22, 2017, 42 Pages.

"Non Final Office Action Issued in U.S. Appl. No. 14/312,979", dated Aug. 11, 2016, 21 Pages.

"Notice of Allowance Issued in U.S. Appl. No. 14/312,979", dated Sep. 1, 2017, 8 Pages.

Bartsch, Daniel, "Creating a Reusable Dialog Class without MFC", Retrieved From http://www.codeguru.com/cpp/w-d/dislog/win32/article.php/c5073/Creating-a-Reusable-Dialog-ClasS-without-MFC.htm, Sep. 5, 2003, 21 Pages.

Book, et al., "A Dialog Flow Notation for Web-Based Applications", in Proceedings of Software Engineering and Applications, Nov. 3, 2003, 6 Pages.

Francis, William, "A Reusable about dialog for your Android apps", Retrieved From http://www.techrepublic.com/blog/software-engineer/a-reusable-about-dialog-for-your-android-apps/, Sep. 30, 2011, 11 Pages.

Kavimandan, et al., "Automated Context-Sensitive Dialog Synthesis for Enterprise Workflows Using Templatized Model Transformation", in Proceedings of the IEEE 12th International Conference on Enterprise Distributed Object Computing, Sep. 15, 2008, 10 Pages.

"International Preliminary Report on Patentability Issued in PCT Application No. PCT/US2015/017881", dated Jun. 16, 2016, 9 Pages.

"International Search Report and Written Opinion Issued in PCT Application No. PCT/US2015/017881", dated May 26, 2015, 12 Pages.

"Second Written Opinion Issued in PCT Application No. PCT/US2015/017881", dated Mar. 17, 2016, 5 Pages.

Schaefer, et al., "Dialog Modelling for Multiple Devices and Multiple Interaction Modalities", in Proceedings of the 5th International Conference on Task models and diagrams for users interface design, Oct. 23, 2006, 8 Pages.

* cited by examiner

METADATA DRIVEN DIALOGS

CROSS-REFERENCE TO RELATED APPLICATIONS

The present application is a continuation of and claims priority to U.S. patent application Ser. No. 14/312,979, filed Jun. 24, 2014, which is based on and claims the benefit of U.S. provisional patent application Ser. No. 61/947,165, filed Mar. 3, 2014, the contents of which are hereby incorporated by reference in their entirety.

BACKGROUND

Computer systems are currently in wide use. Many computer systems are quite large, and have a large number of pages, forms, or other display surfaces.

For instance, some such computer systems include business systems. Business systems can include, for example, enterprise resource planning (ERP) systems, customer relations management (CRM) systems, line-of-business (LOB) systems, among others. These types of systems can have thousands of different forms, each of which have many different controls.

Many of these kinds of computer systems also have dialog displays. The dialogs are often hard coded relative to the parent page being displayed. They are often optimized for rendering on one particular type of client device. Therefore, users of other client devices do not have the same rich experience with respect to the dialog displays.

In addition, such computer systems may have a relatively large number of pre-defined dialogs that can be used by a developer in developing the system for a particular customer. However, because the dialogs are hard coded, the pre-defined dialogs cannot be modified without a great deal of coding. This is a cumbersome process, and it can be error prone.

The discussion above is merely provided for general background information and is not intended to be used as an aid in determining the scope of the claimed subject matter.

SUMMARY

Dialog metadata is used to generate a metadata driven dialog definition. The metadata can define logic that is run on the dialog, and customizations to the dialog are made by modifying the dialog metadata.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
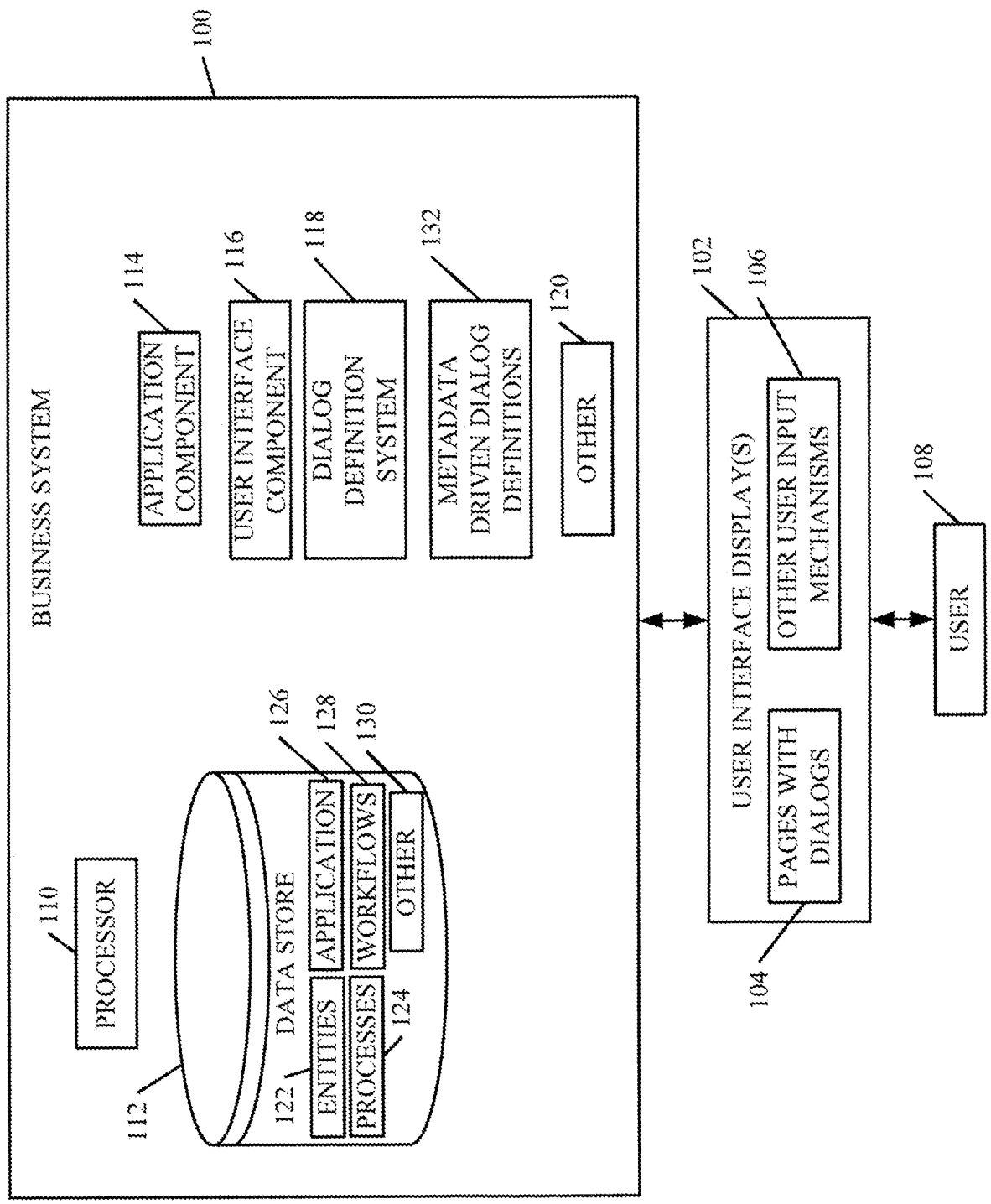
FIG. 1 is a block diagram of one illustrative business system.

FIG. 1 is a block diagram of one illustrative business system 100. Business system 100 is shown generating user interface displays 102 that can include pages 104 with dialogs, as well as other user input mechanisms 106. User 108 interacts with the user interface displays 102 (such as with the dialogs and other user input mechanisms on the pages) in order to interact with, and manipulate, business system 100.

Business system 100 illustratively includes processor 110, data store 112, application component 114, user interface component 116 and dialog definition system 118. It can also include other components 120 as well.

Data store 112, itself, illustratively includes entities 122, processes 124, applications 126, workflows 128 and other data records 130. Entities 122 illustratively describe and define entities within business system 100. For instance, a customer entity describes and defines a customer. A vendor entity describes and defines a vendor. An inventory item entity describes and defines an item of inventory. A purchase order entity describes and defines a purchase order. This list is but a small example of the various different types of entities that can be defined within business system 100.

Applications 126 are illustratively business applications, such as general ledger applications, other accounting applications, inventory tracking applications, applications that track opportunities, as well as a host of other business applications. Application component 114 illustratively runs applications 126, which can include business processes 124 and workflows 128. Processes 124 and workflows 128 illustratively operate on business data entities 122 and other business records 130 to enable user 108 to perform his or her tasks within business system 100. The processes and workflows can be automated, semi-automated, or manual. User interface component 116, either by itself, or under the control of other items in business system 100, illustratively generates user interface displays 102.

Dialog definition system 118 can illustratively be accessed by user 108 through user interface displays 102, in order to generate metadata driven dialogs. That is, the dialogs have a metadata definition 132 that can be generated by user 108 (who may also be a developer).

For purposes of the present discussion, a dialog in business system 100 is a display that is shown on top of a parent page and does not change the user's context. That is, the parent page can still be seen behind a pop-up dialog so that the user can provide inputs on the pop-up display, without losing the context of the application in which the user is operating. The pop-up display adds additional context to what the user is viewing on the main page.

Figure 1A:
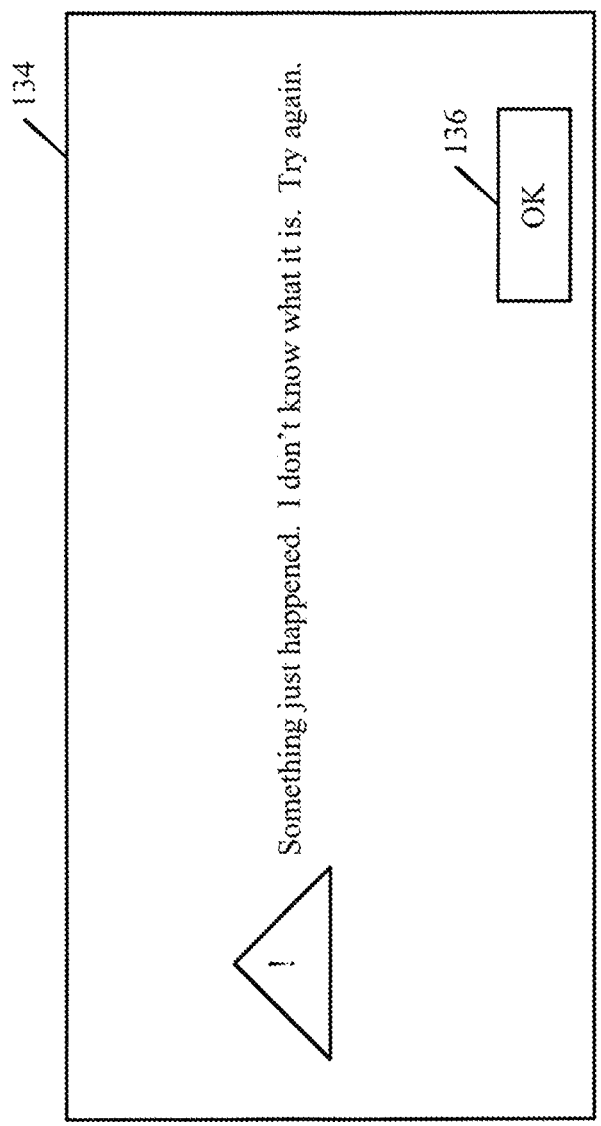
FIGS. 1A and 1B show two examples of dialogs.

There are a number of different types of dialogs. FIG. 1A shows one exemplary user interface display illustrating an example of an alert dialog 134. The alert dialog simply displays an informational message and allows the user to interact with the dialog in order to have it disappear. For example, in the embodiment shown in FIG. 1A, dialog 134 includes an "OK" button 136. When the user actuates button 136, dialog 134 disappears.

Figure 1B:
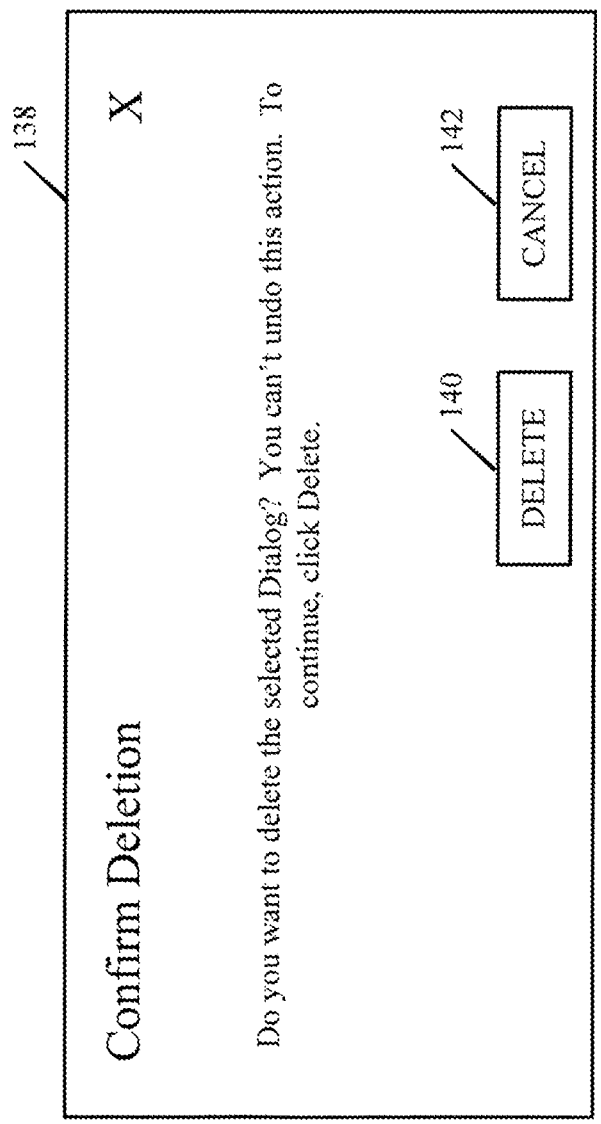

FIG. 1B is one example of a user interface display showing an exemplary confirmation dialog 138. A confirmation dialog illustratively provides information to the user and asks the user to either confirm or deny that information. In the example shown in FIG. 1B, dialog 138 is asking the user to confirm whether he or she wishes to delete a dialog. If the user actuates user input mechanism 140, the user confirms the proposed action, and that action is executed. If the user actuates user input mechanism 142, the action is canceled.

There can also be a more customized or complex dialogs as well. Such a dialog may be displayed to indicate that the user is attempting to take an action, but that some information is missing. For example, if the user actuates a "Submit" button on a form, but the user has not included all of the information, then a complex dialog may appear instructing the user to enter information into certain fields on the form, or to enter it into fields on the dialog, itself.

Figure 2A:
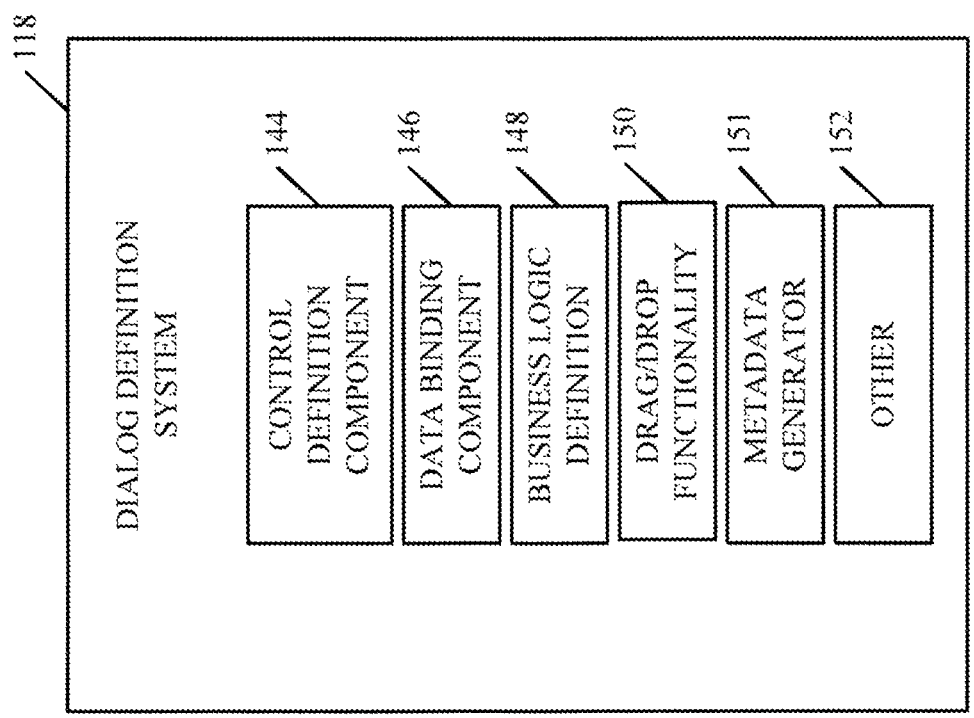
FIG. 2A is a more detailed block diagram of a dialog definition system (or dialog editor).

Before describing the operation of dialog definition system 118 in more detail, a more detailed block diagram of dialog definition system 118 and a metadata driven dialog definition 132 will first be described. FIG. 2A shows a more detailed block diagram of one embodiment of dialog definition system 118. FIG. 2 shows that system 118 illustratively includes a control definition component 144, a data binding component 146, a business logic definition component 148, drag and drop functionality 150, metadata generator 151, and it can include other items 152 as well.

Figure 2B:
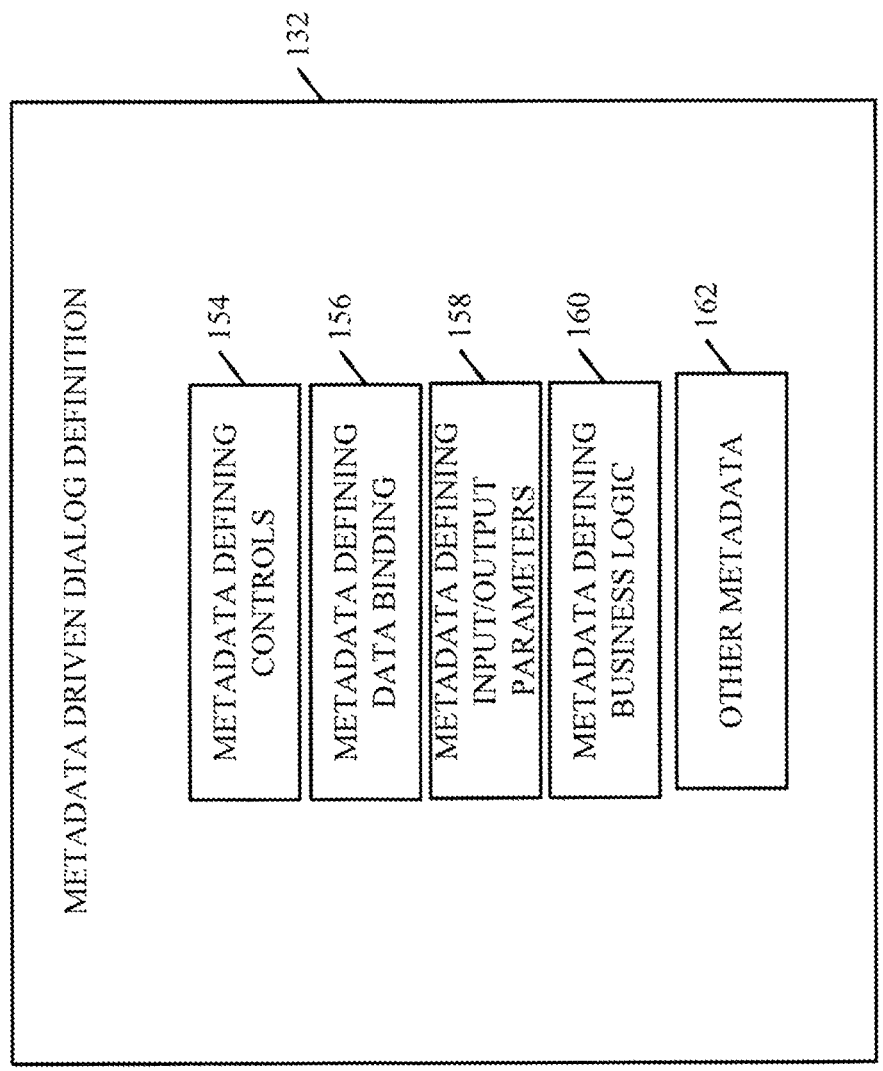
FIG. 2B is a more detailed block diagram illustrating metadata components defining a metadata driven dialog definition.

FIG. 2B shows a more detailed view of metadata driven dialog definition 132. Metadata driven dialog definition 132 illustratively includes metadata 154 defining controls on the dialog, metadata 156 defining data bindings that are bound to the controls on the dialog, metadata 158 defining input/output parameters for the dialog, metadata 160 defining business logic on the dialog, and other metadata 162.

Control definition component 144 in system 118 allows a developer to provide inputs that generate metadata 154 that define controls on the dialog 132. In one example, drag and drop functionality 150 displays a palate of controls that the user can place on a given dialog, using drag and drop inputs. For instance, if the user wishes to have a text box control or a radio button control, the user simply drags the desired control from the palate onto the dialog surface.

Data binding component 146 illustratively provides user interface displays that allow a developer to provide inputs that generate metadata 156 which define the data binding between the controls on the dialog and the underlying data. This can also be done using drag and drop functionality 150, using drop down menus, or in other ways.

Business logic definition system 148 illustratively generates user interface displays that allow a developer to provide inputs that generate metadata 160 defining business logic on the dialog. As a simple example of business logic that can run on a dialog, it may be that a dialog asks the user for his or her marital status. If the user provides an input indicating that he or she is married, then a business logic rule will run on the dialog to automatically display a field for entering the spouse's name as well as the user's name. Of course, a wide variety of different types of business logic can be defined in metadata and run on the dialog as well. Business logic definition system 148 also allows the developer to provide inputs that generate metadata 158 that define the input and output parameters for the dialog.

Figure 3:
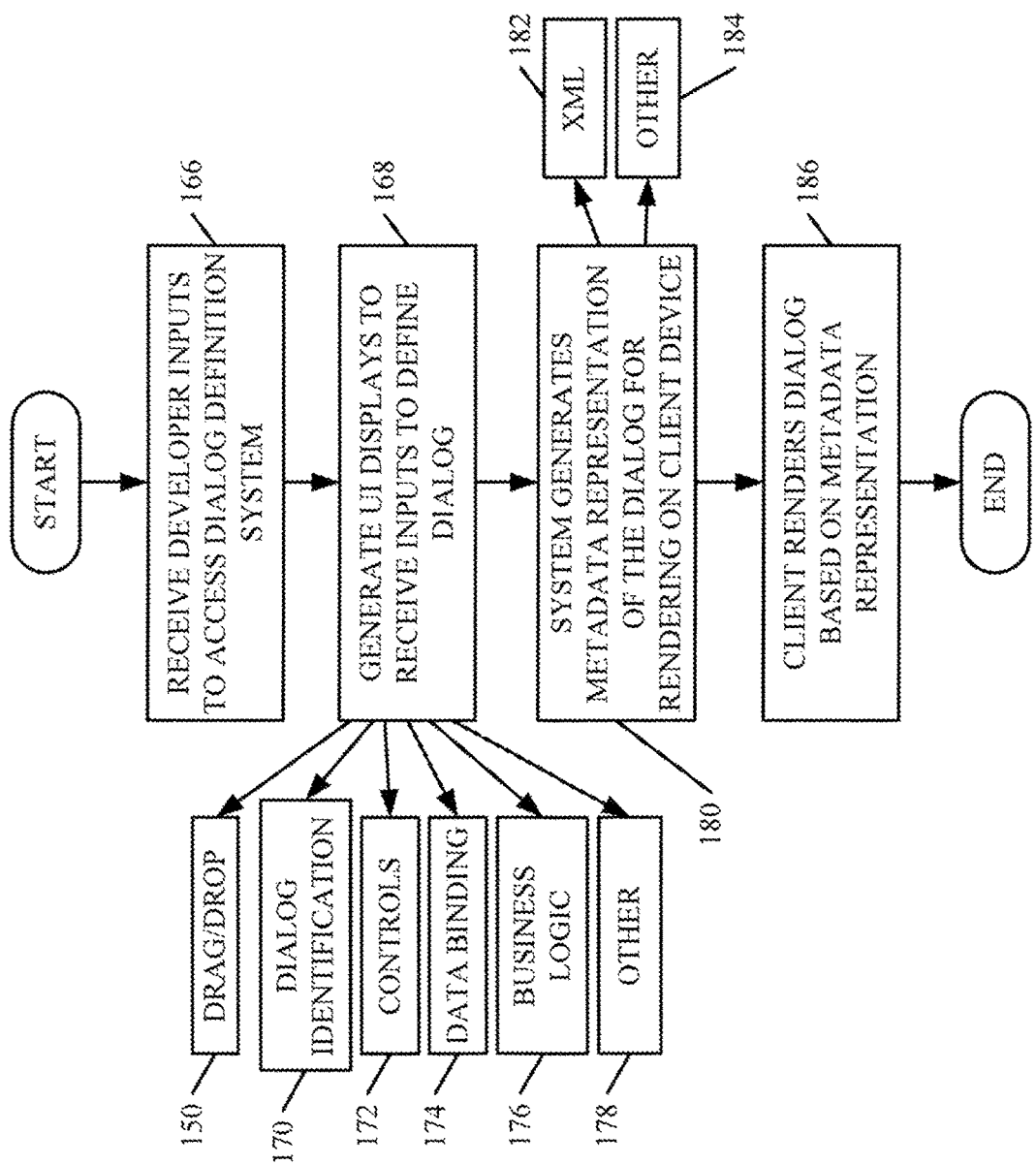
FIG. 3 is a flow diagram illustrating one embodiment of the operation of the dialog definition system in receiving developer inputs to define a dialog, in metadata.

FIG. 3 is a flow diagram illustrating one embodiment of the operation of dialog definition system 118 in allowing a developer to define a dialog in metadata. System 118 first receives a developer input indicating that the developer wishes to access dialog definition system 118. This is indicated by block 166 in FIG. 3.

In response, dialog definition system 118 generates user interface displays that receive user inputs to define the dialog. This is indicated by block 168. As briefly described above, system 118 can allow the user to use drag and drop functionality 150. The user can provide inputs to identify the dialog, such as providing a dialog name, description, etc. This is indicated by block 170 in FIG. 3. The user can also provide inputs used to generate controls 172 on the dialog, to define the data binding 174, to define the business logic 176 and to define other items 178, such as the input and output parameters, etc.

Figure 3A:
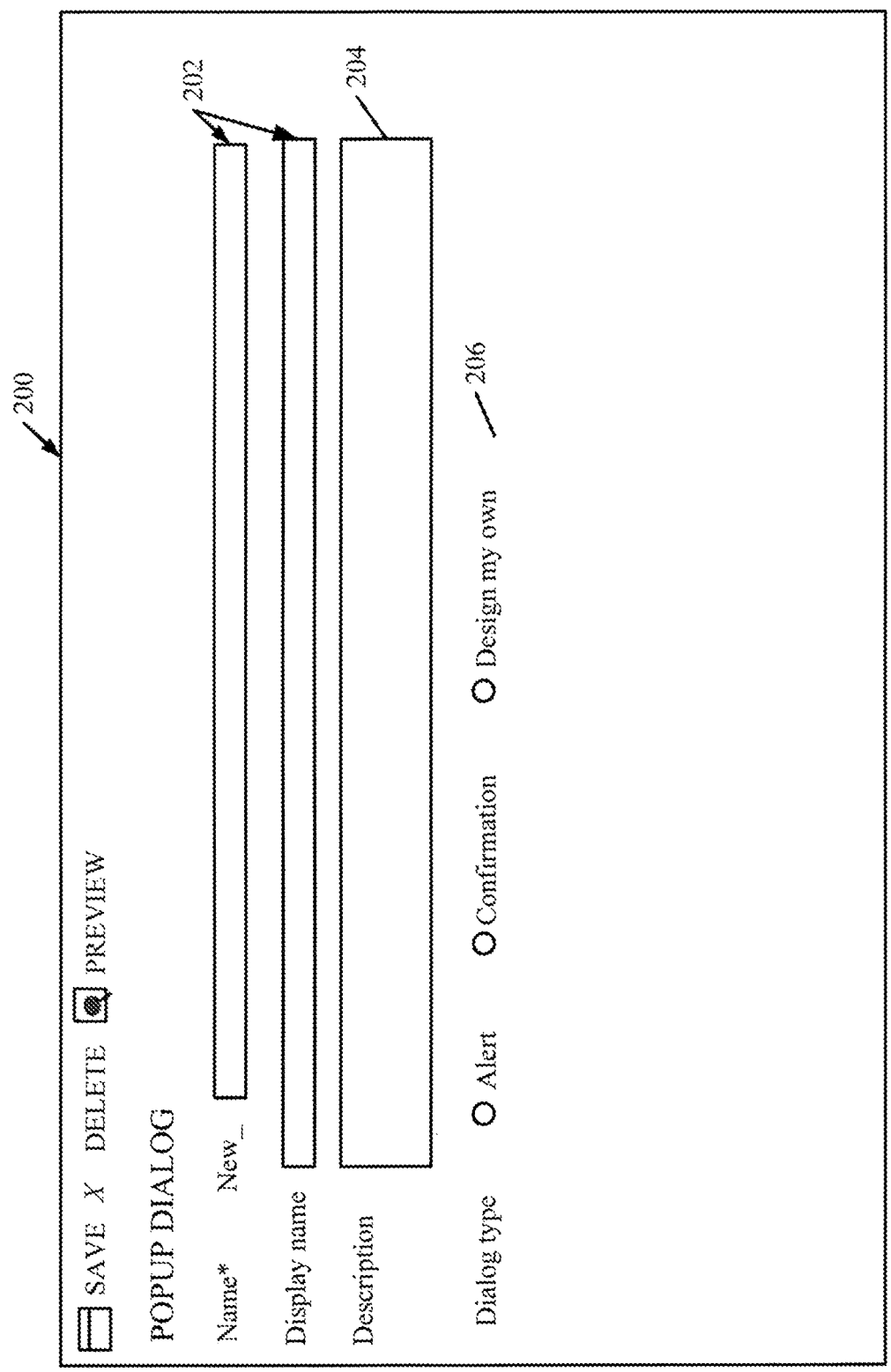
FIG. 3A-3F show examples of user interface displays.

FIGS. 3A-3F show various examples of user interface displays that can be generated by the dialog definition system in allowing a developer or user to generate or modify dialogs in the business system. FIG. 3A shows a user interface 200. Display 200 has user input mechanisms that can be actuated by the user to define a new dialog. A name mechanism 202 allows the user to enter a name and a display name description mechanism 204 allows the user to enter a description of the new dialog. A dialog type mechanism 206 allows the user to select among a variety of different dialog types. The example shown in FIG. 3A allows the user to select an alert dialog, a confirmation dialog or to design a custom dialog. Based on which type of dialog the user selects, dialog definition system 118 will illustratively walk the user through a design experience specific to the selected dialog type. In doing so, in one example, system 118 will enforce certain design criteria. For instance, system 118 will enforce that the dialog name is unique, that only certain kinds of controls are on certain types of dialogs, among other things.

Figure 3B:
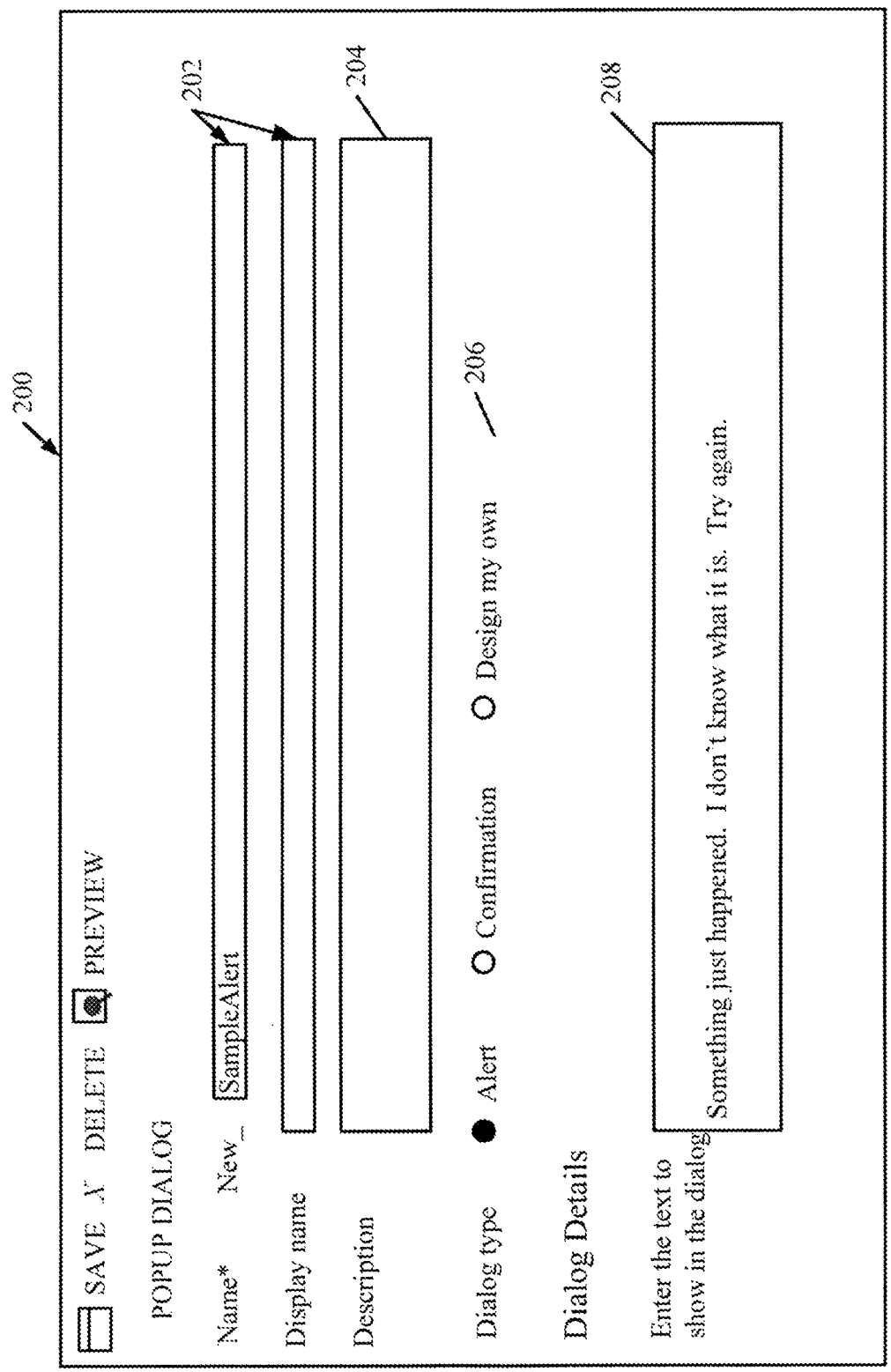

FIG. 3B shows one example of user interface display 200, where the user has named the dialog "SampleAlert" and has selected the type of dialog as an Alert dialog. FIG. 3B also shows that the system 118 has prompted the user to enter, in dialog details section 208, the text that the user wishes the Alert dialog to display, when it is rendered on a parent page in the business system. The user has entered the text "Something just happened. I don't know what it is. Try again."

Figure 3C:
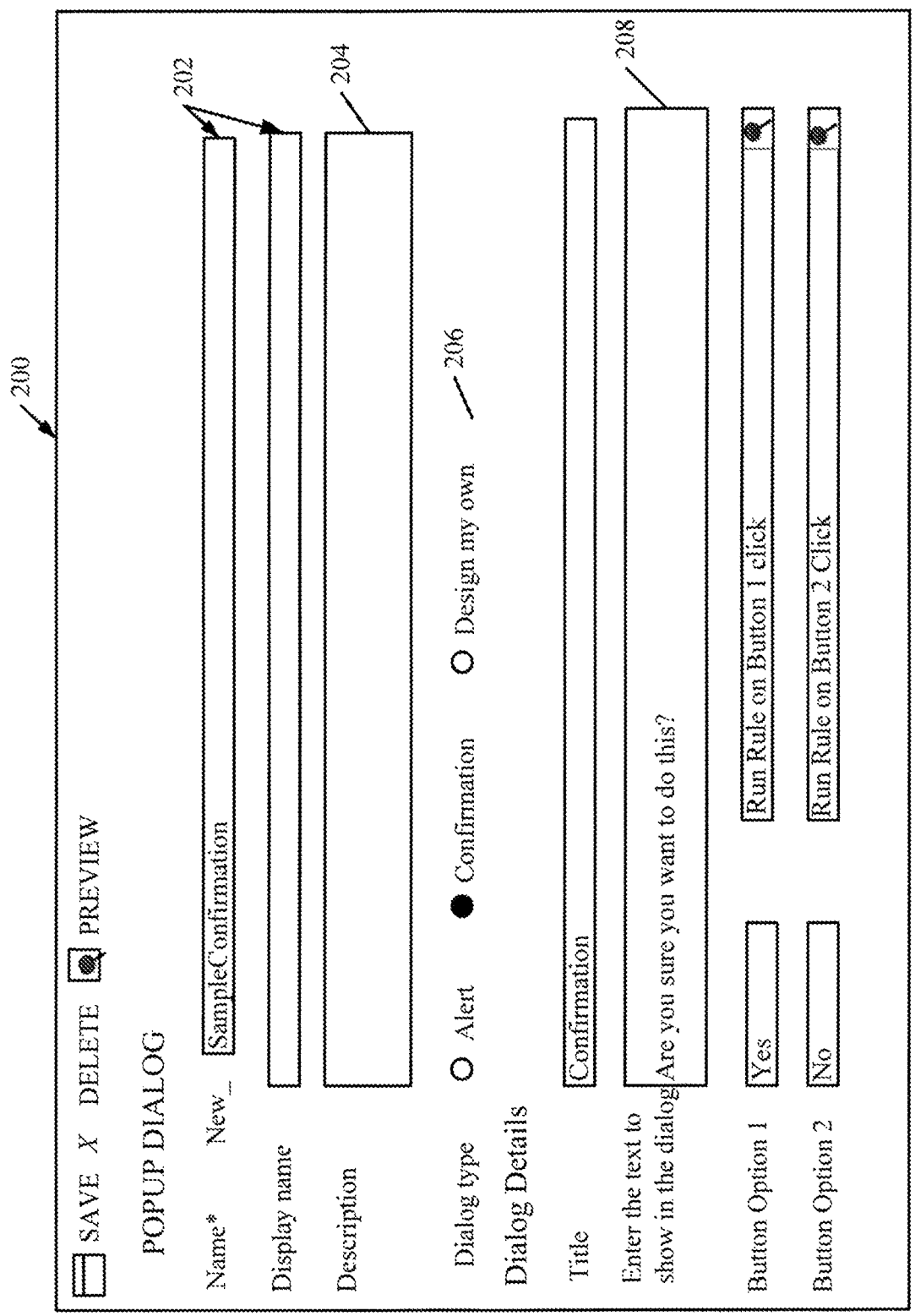

FIG. 3C shows another example of user interface display 200, where the user has named the dialog "SampleConfirmation" and selected the dialog type as a Confirmation dialog. It can also be seen in the example of FIG. 3C that system 118 has prompted the user to enter text that the user wishes to have displayed in the dialog. The user has entered "Are you sure you want to do this?". System then displays a plurality of different controls that the user can have on the dialog. The controls for thew Confirmation dialog correspond to a Yes button and a No button. Each control describes what will happen when it is actuated. For example, the user interface display 200 shows that if the Yes button is clicked, a given rule will be run by the business system. If the No button is clicked, another rule will be run by the business system.

Figure 3D:
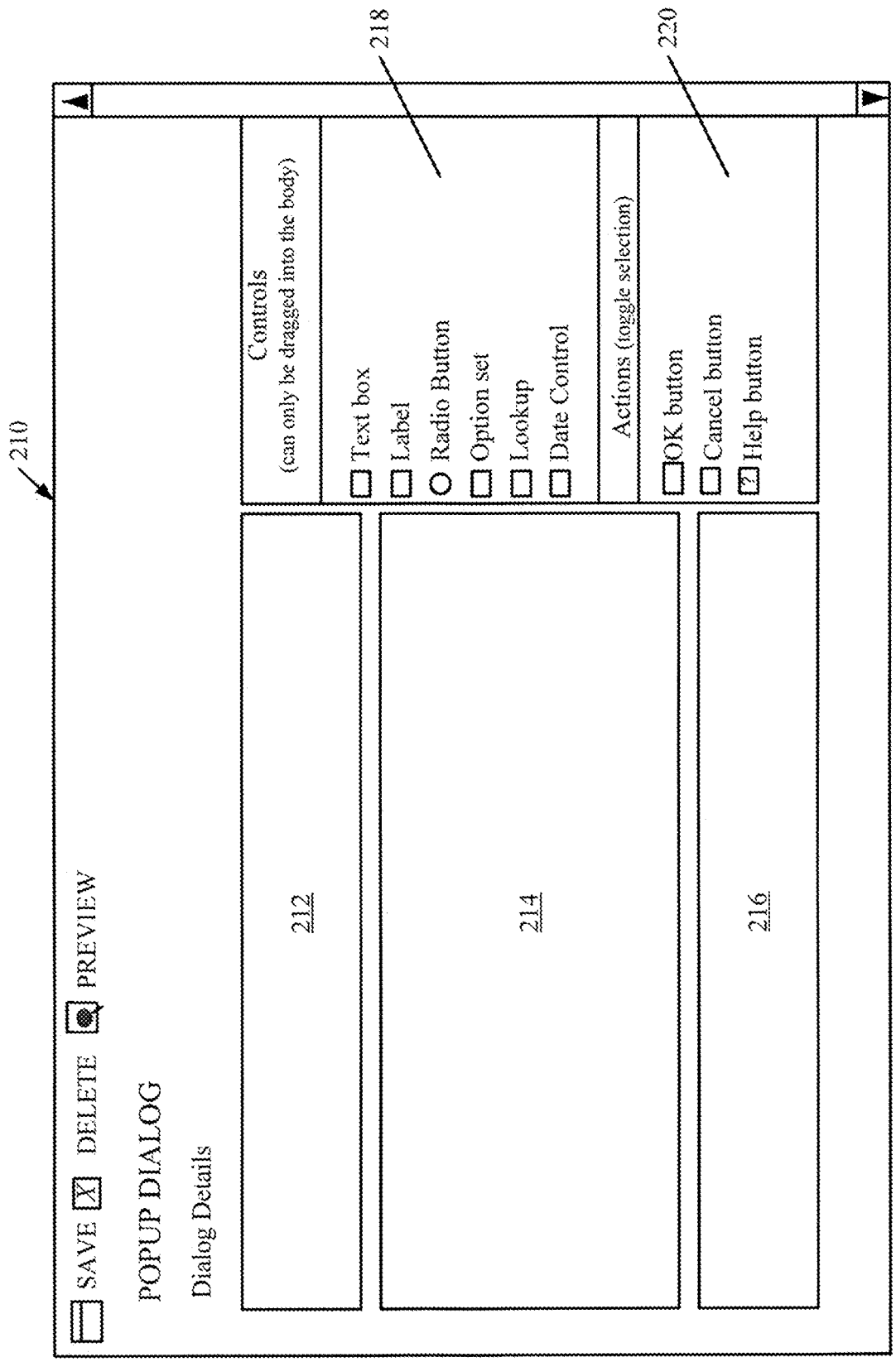
Figure 3E:
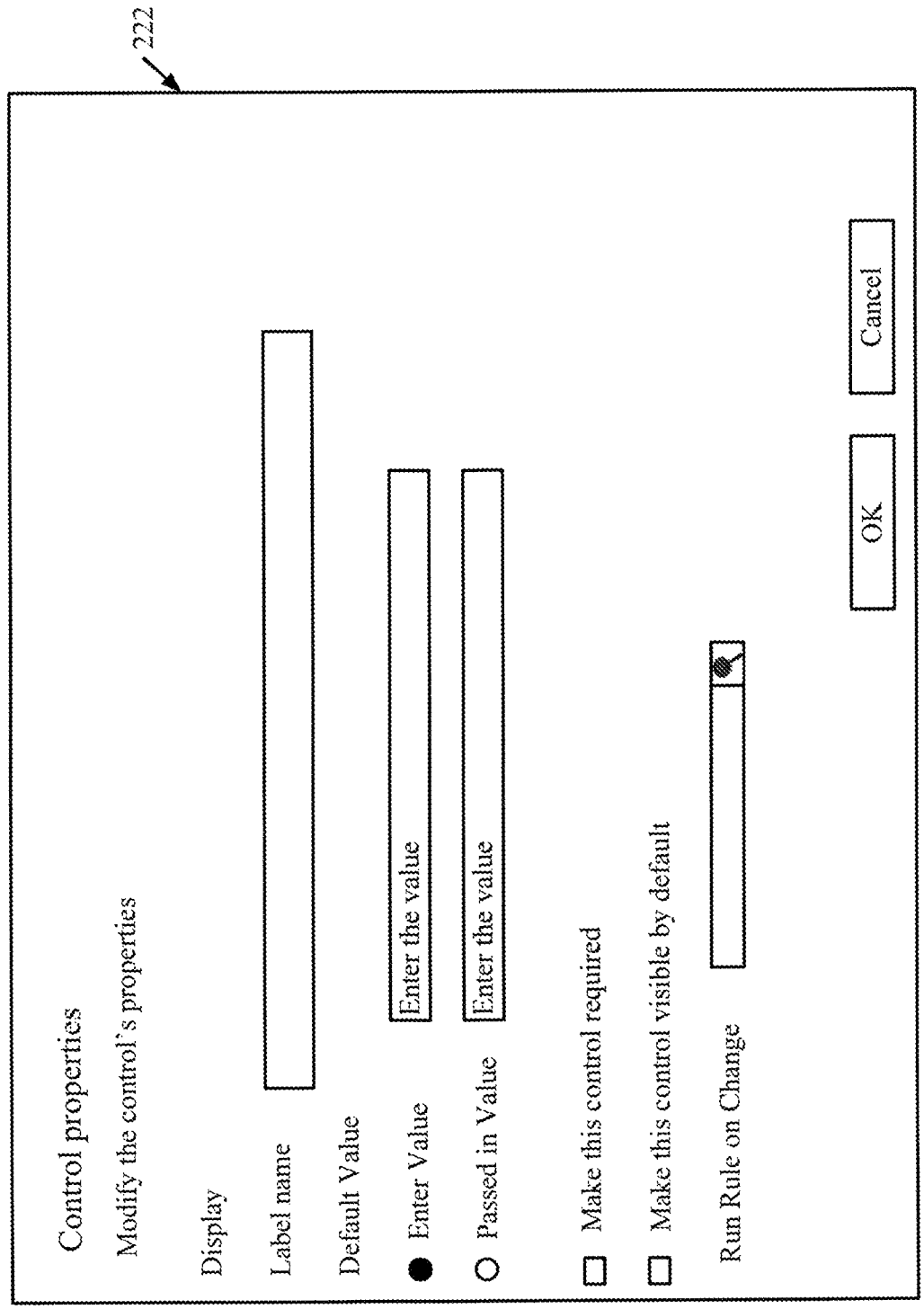
Figure 3F:
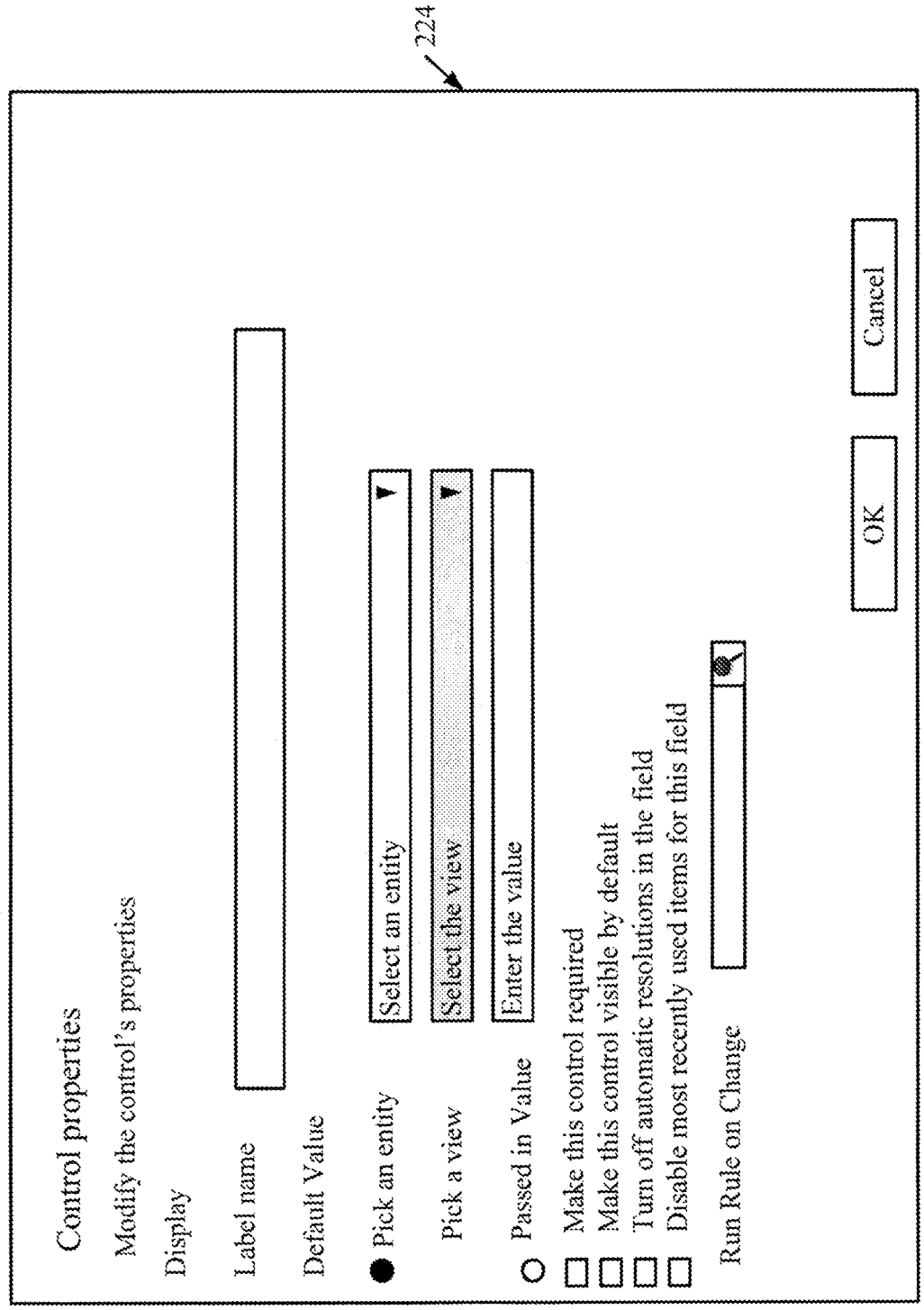

FIG. 3D shows an example user interface display 210 that can be generated by the dialog definition system 118 when the user selects the dialog type as a custom dialog. Display 210 illustratively includes dialog layout portion that includes a header section 212, a body section 214 and a footer section 216. Sections 212, 214 and 216 correspond to sections that will appear on the rendered dialog. Display 210 also includes controls section 218 and actions section 220. Section 218 includes a set of controls that can be added to the dialog by the user dragging a control from section 218 onto body 214 and dropping it there. Section 220 includes a set of buttons that can be added to the dialog by the user dragging them from section 220 onto one of sections 212, 214 and 216 and dropping it there. In one example, system 118 only allows the user to drag certain items onto certain sections 212, 214 and 216. For instance, in one example, the user can only drag the help button from section 220 on the header 212. The user can only drag controls from section 218 onto the body 214 and the user can only drag the cancel and ok buttons from section 220 onto the footer 216. Of course, these are only examples. In other examples, the user can drag any item from sections 218 and 220 onto any other sections, or any other restrictions can be enforced, other than those mentioned. The header section 212 illustratively includes input mechanisms that allow the user to input the dialog name that will be displayed when the dialog is shown. In one example, FIG. 3E shows an example of another user interface display 222. Display 222 can be generated by dialog definition system 118 to show the user properties of a given control. In one example, the user can have system 118 show the control properties display 222 by, for instance, double clicking on a given control. System 118 then retrieves the properties of the given control and allows the user to view and modify those properties. In the example shown in FIG. 3E, the user double clicked on a textbox control. Thus, the system 118 shows the properties for that type of control. FIG. 3F is similar to FIG. 3E, except that the user has double clicked the lookup control. Therefore, system 118 generates the properties display 224 showing the properties for the lookup control.

Once the user has provided all of the desired inputs to define the dialog, metadata generator 151 in dialog definition system 118 generates a meta representation of the dialog for rendering on client devices. This is indicated by block 180 in FIG. 3. The metadata definition can be in extensible markup language (XML) as indicated by block 182, or in another metadata representation 184.

Table 1 below provides one simple example of a metadata representation of a dialog. It can be seen in Table 1 that the metadata representation is an XML representation that defines a dialog title and a body that defines a set of controls. The metadata representation also defines buttons, and display style information for rendering the dialog. It will be noted that Table 1 is but one exemplary embodiment of a metadata representation of a dialog, and a wide variety of others can be used as well.

TABLE 1

```
<dialog>
    <title>
        The title goes here
        <icon alttext="Some text"> some image.jpg</icon>
    </title>
    <body>
        <control>
            <Name> Name </Name>
            <Value>Enter the name </Value>
            <type>Lookup </type>
            <parameter name ="DisplayName"></parameter>
            <function> Onchange function </function>
        </control>
        <control>
            <Name> Name </Name>
            <type>Lookup </type>
            <parameter name ="DisplayName" datatype="string" format="url"
            ></parameter>
            <function> Onchange function </function>
        </control>
    </body>
    <buttons>
      <button>
         <name> OK </name>
         <Value> Done </Value>
         <function>Process return value </function>
      </button>
        <button>
            <name>Cancel</name>
            <Value> Ignore </Value>
                <function>close window</function>
        </button>
        <button>
            <name>Help</name>
            <URL>URL to help file</URL>
        </button>
    </buttons>
    <displayStyle>
        [ error | warning | message ]
    </displayStyle>
    <height>500</height>
    <width>300</width>
    <top>100</top>
<left>300</left>
</dialog>
```

Once the metadata definition of the dialog is generated, it is illustratively output so that clients can render the dialog based on the metadata representation. This is indicated by block 186. It will be appreciated that, because the dialog is represented in metadata, it can be rendered in different ways, by the particular client device rendering it. The metadata defines the content of the dialog, but the client rendering device decides how to render it. This can thus be done in a client-specific way so that it is rendered in a way suitable for the given client. Therefore, for instance, a desktop device may render the dialog in one way, while a smartphone or tablet computer, or another type of client device may render the dialog in a different way. Each client device can render the metadata in the way that provides the richest user experience with respect to the dialog.

Figure 4:
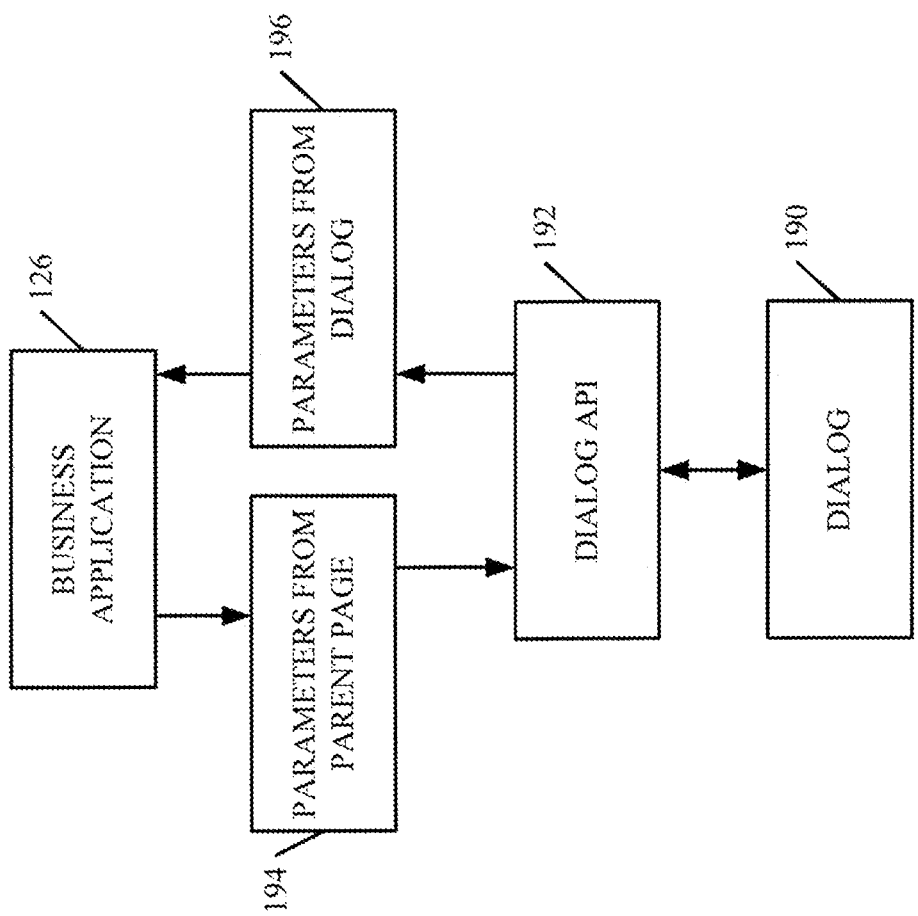
FIG. 4 is a block diagram of one architecture in which the dialog can be used by a business application in the business system of FIG. 1.

FIG. 4 is a block diagram of one illustrative architecture or dialog framework in which a business application 126 (form business system 100 shown in FIG. 1) uses a dialog 190 that is defined using a metadata representation. Dialog 190 corresponds to the dialog user interface display, and it illustratively exposes a dialog application programming interface 192. At some point, the user will do something to cause dialog 190 to be rendered. The business system 100 retrieves the metadata definition display 190 and provides it to the client device, which renders it as dialog 190. Business application 126 accesses dialog 190 through dialog API 192. When the dialog is displayed, it illustratively has a parent page that is in a given application context in a business application. The parent page can provide input parameters 194 to the dialog 190, through dialog API 192. The dialog input parameters 194 illustratively include content and fields with data passed in from the parent page. When dialog 190 is rendered, and when the user interacts with dialog 190, the dialog 190 returns parameters 196, through dialog API 192, to the parent page of business application 126. The parameters 196 illustratively reflect the results of the user interaction with the dialog. For example, if the user confirms an action through a confirmation dialog, this information is passed back as one of the parameters 196 from dialog 190. If the user enters additional information through the dialog, this information is passed back as well. These are examples only.

It can thus be seen that a metadata driven abstraction is used to represent a dialog. The dialog definition can thus be easily customized and extended by a developer simply by changing the metadata. The metadata definition is deployed in a dialog framework that uses metadata definitions to define the content of dialogs, without hard coding them to a parent page. Instead, using the metadata abstraction, the dialogs can be easily modified. The ultimate rendering of the dialog is left to the device actually doing the rendering. In addition, in one embodiment, the metadata defines business logic that is run on the dialog. Thus, not only can business logic be run on the dialog, but it can easily be customized or extended by the developer, simply by changing the metadata that defines the business logic.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
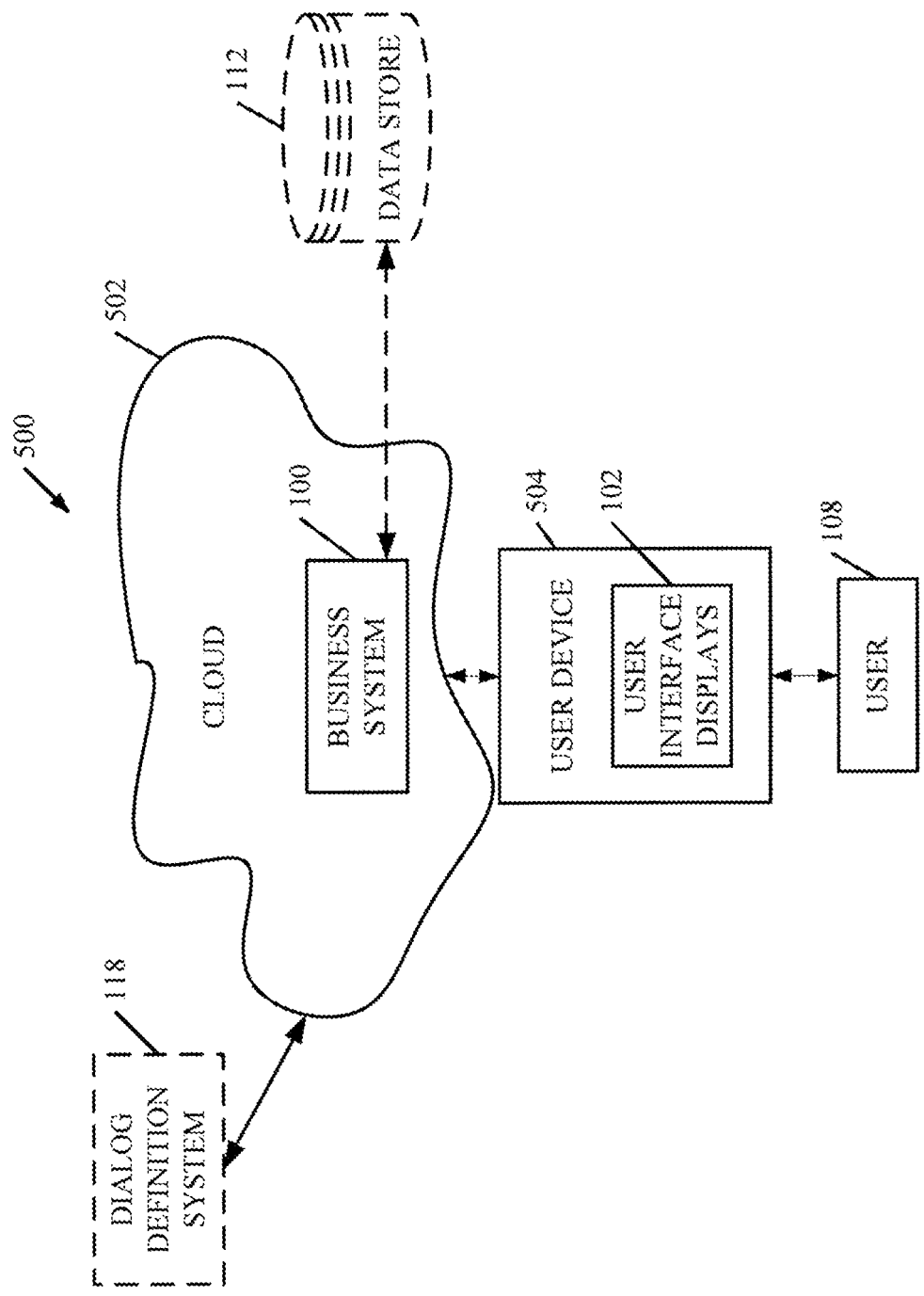
FIG. 5 is a block diagram showing the system of FIG. 1 disposed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that business system 100 is located in cloud 502 (which can be public, private, or a combination where portions are public while others are private). Therefore, user 108 uses a user device 504 to access those systems through cloud 502.

FIG. 5 also depicts another embodiment of a cloud architecture. FIG. 5 shows that it is also contemplated that some elements of business system 100 can be disposed in cloud 502 while others are not. By way of example, data store 112 can be disposed outside of cloud 502, and accessed through cloud 502. In another embodiment, dialog definition system 118 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
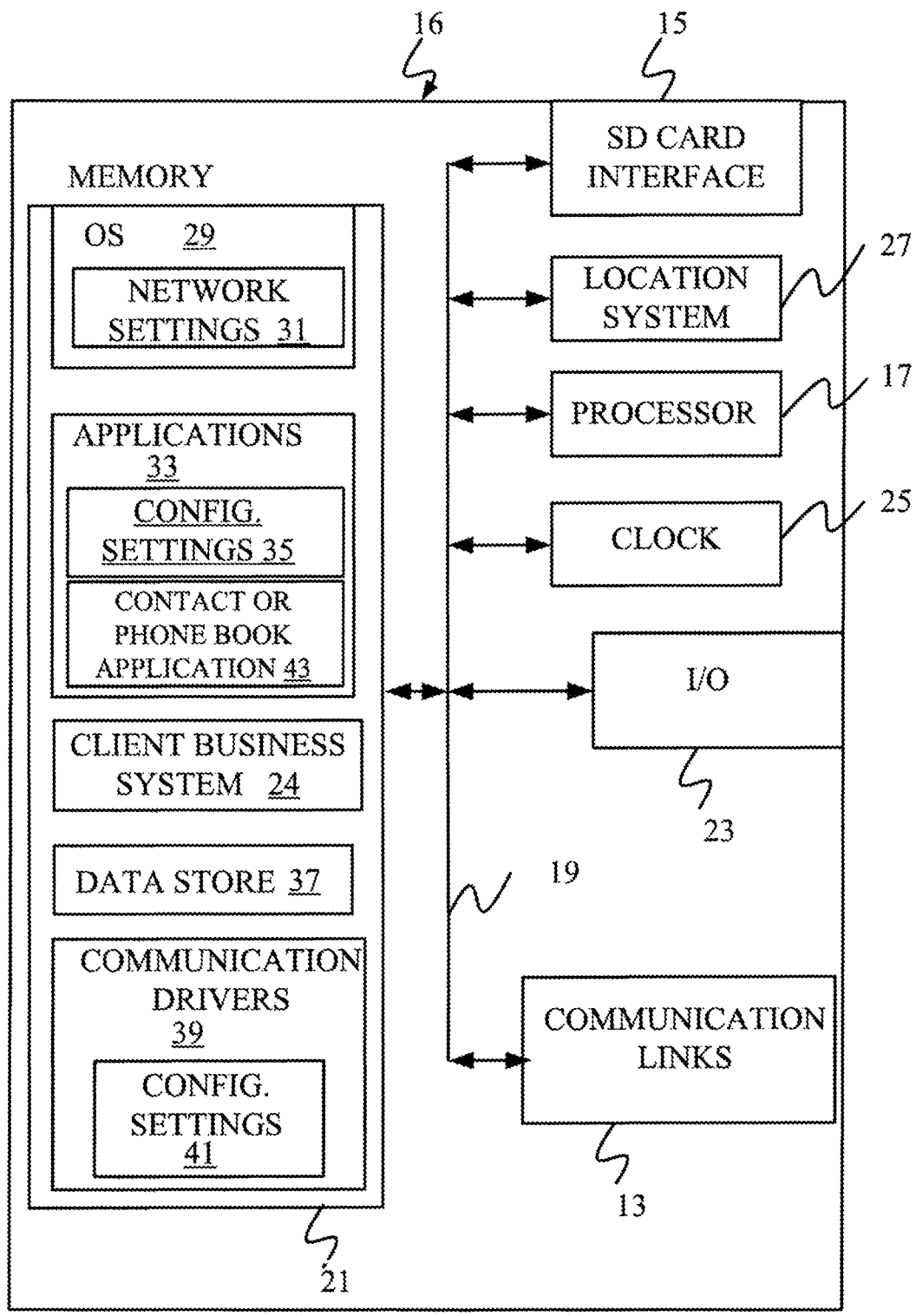
FIGS. 6-10 show various embodiments of mobile devices.
Figure 7:
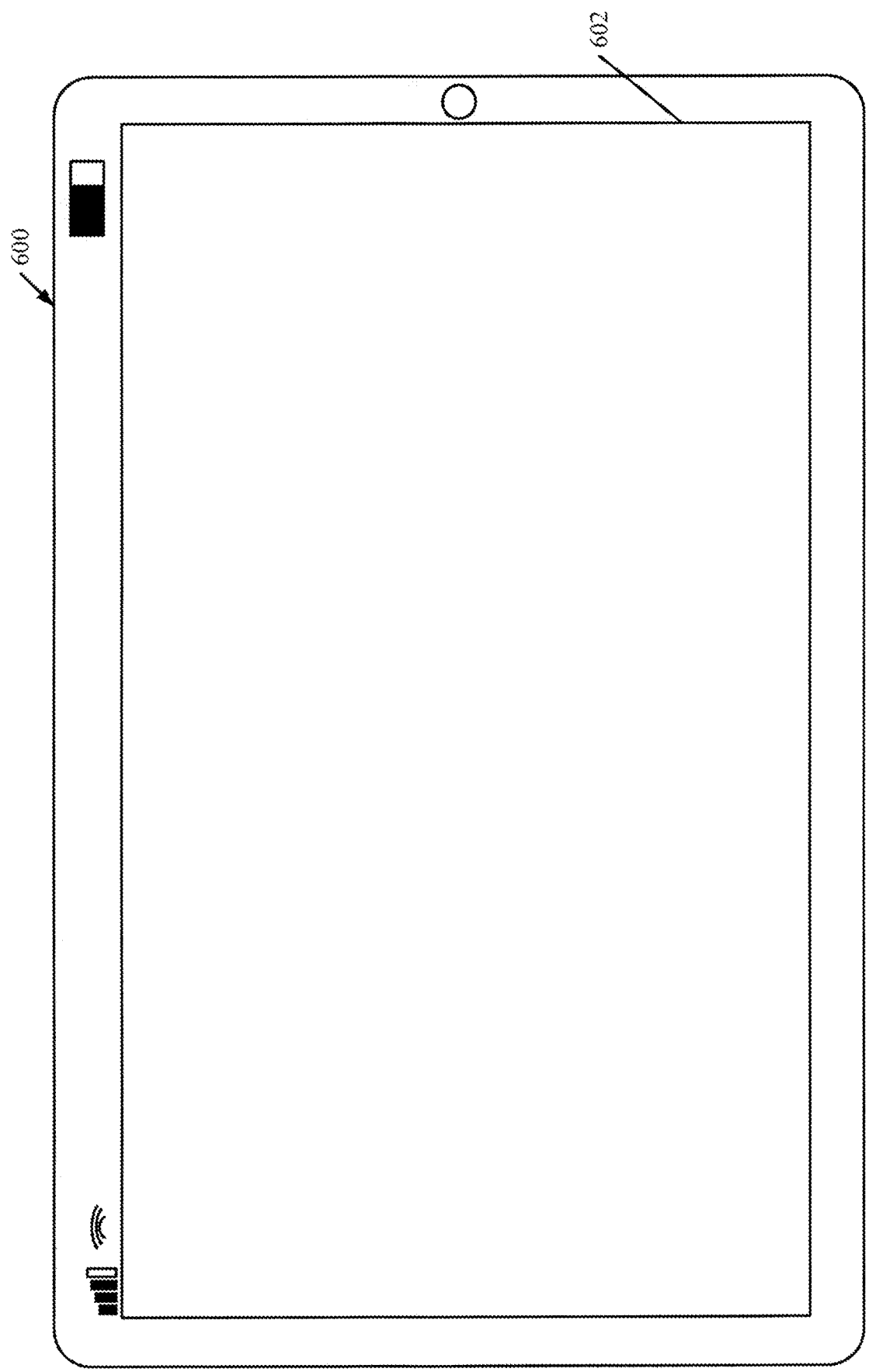
Figure 8:
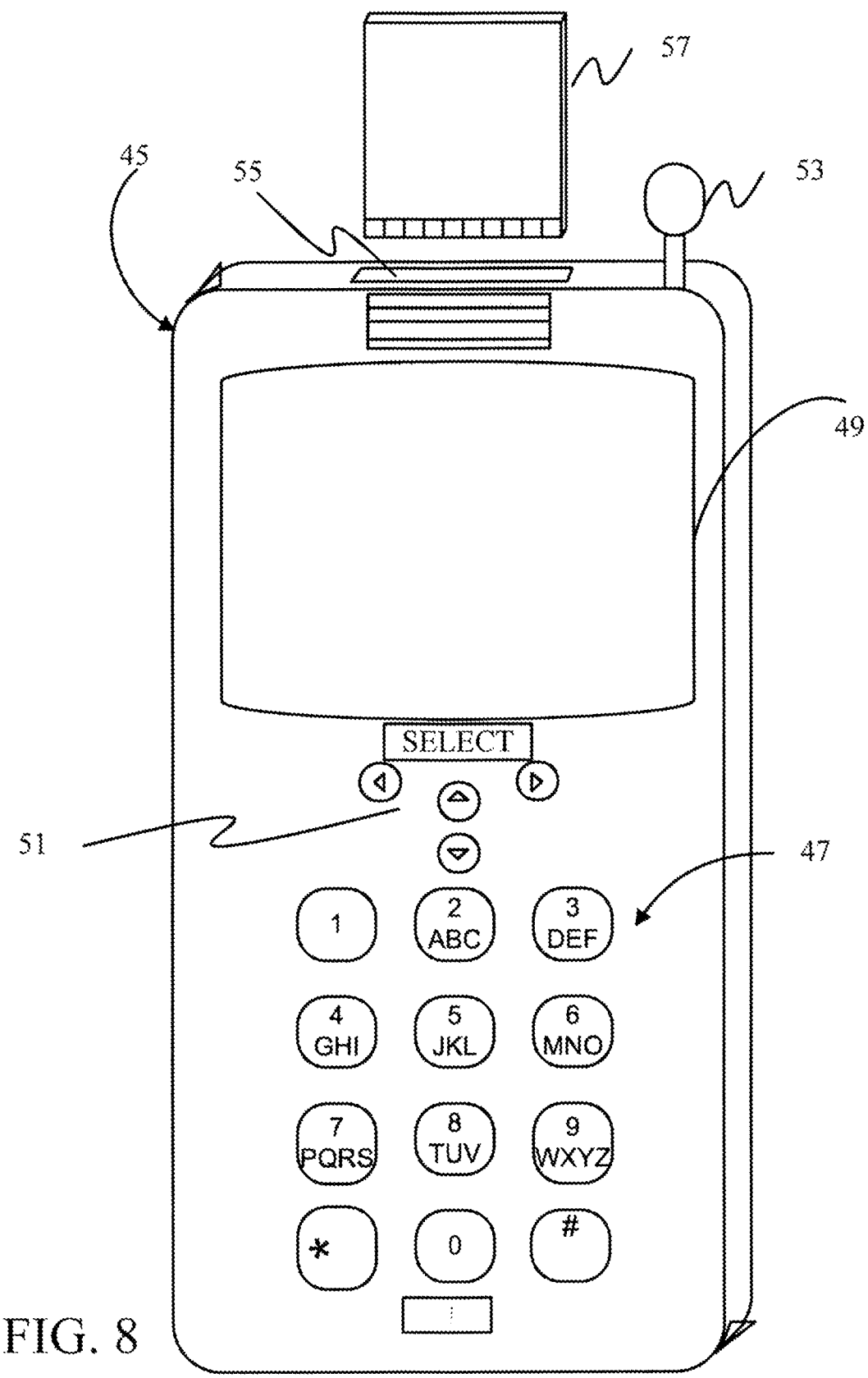
Figure 9:
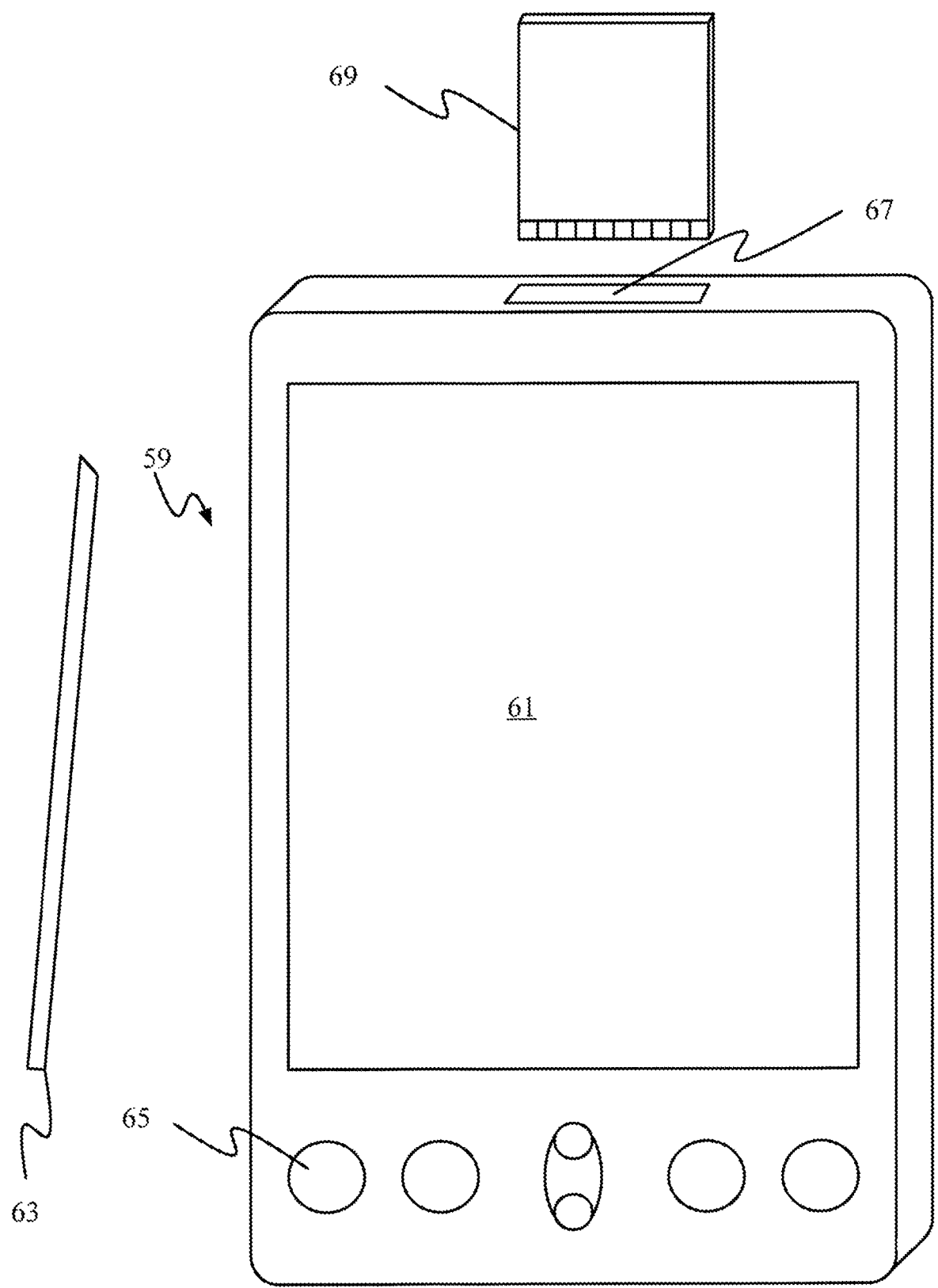

FIG. 6 is a simplified block diagram of one illustrative embodiment of a handheld or mobile computing device that can be used as a user's or client's hand held device 16, in which the present system (or parts of it) can be deployed. FIGS. 7-9 are examples of handheld or mobile devices.

FIG. 6 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 110 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIGS. 8 and 9 provide additional examples of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
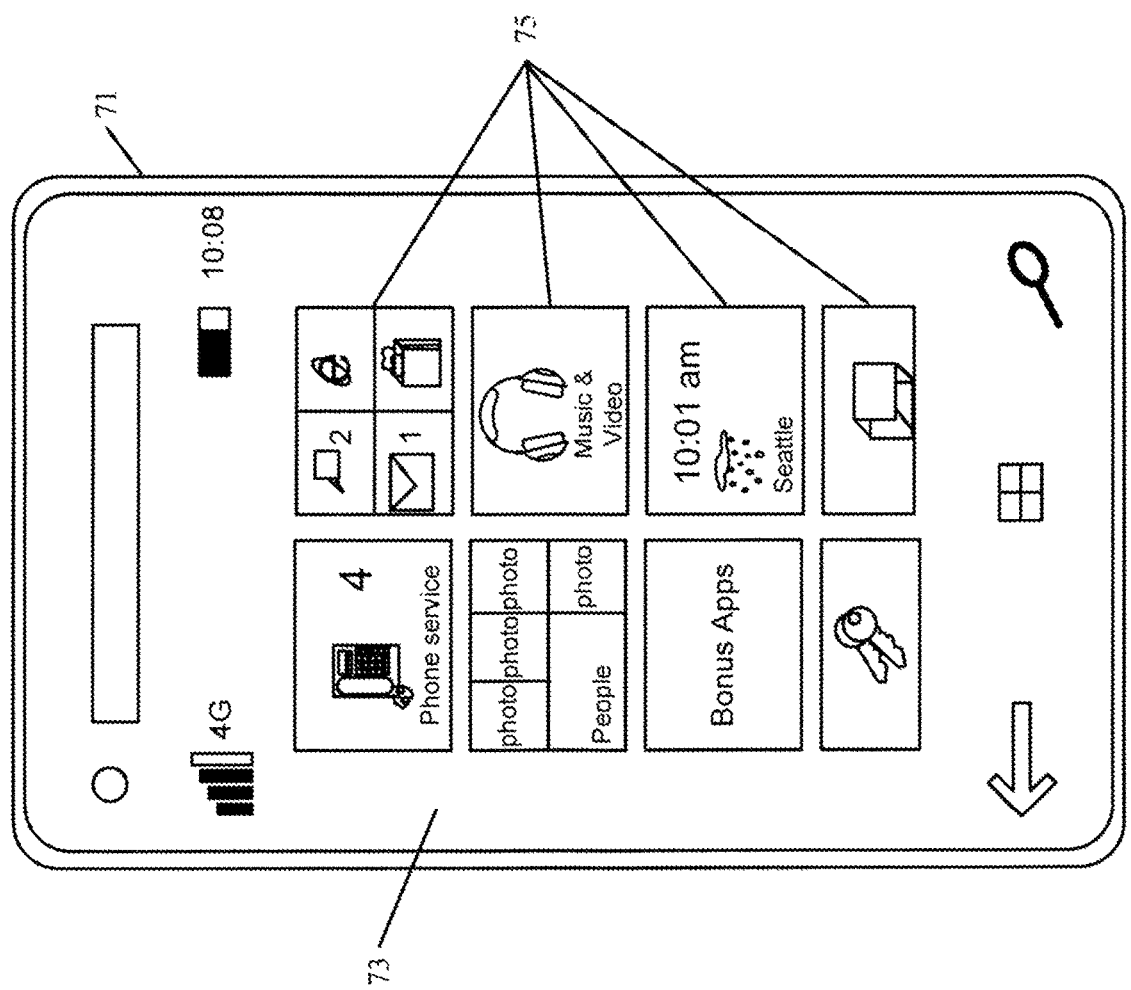

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
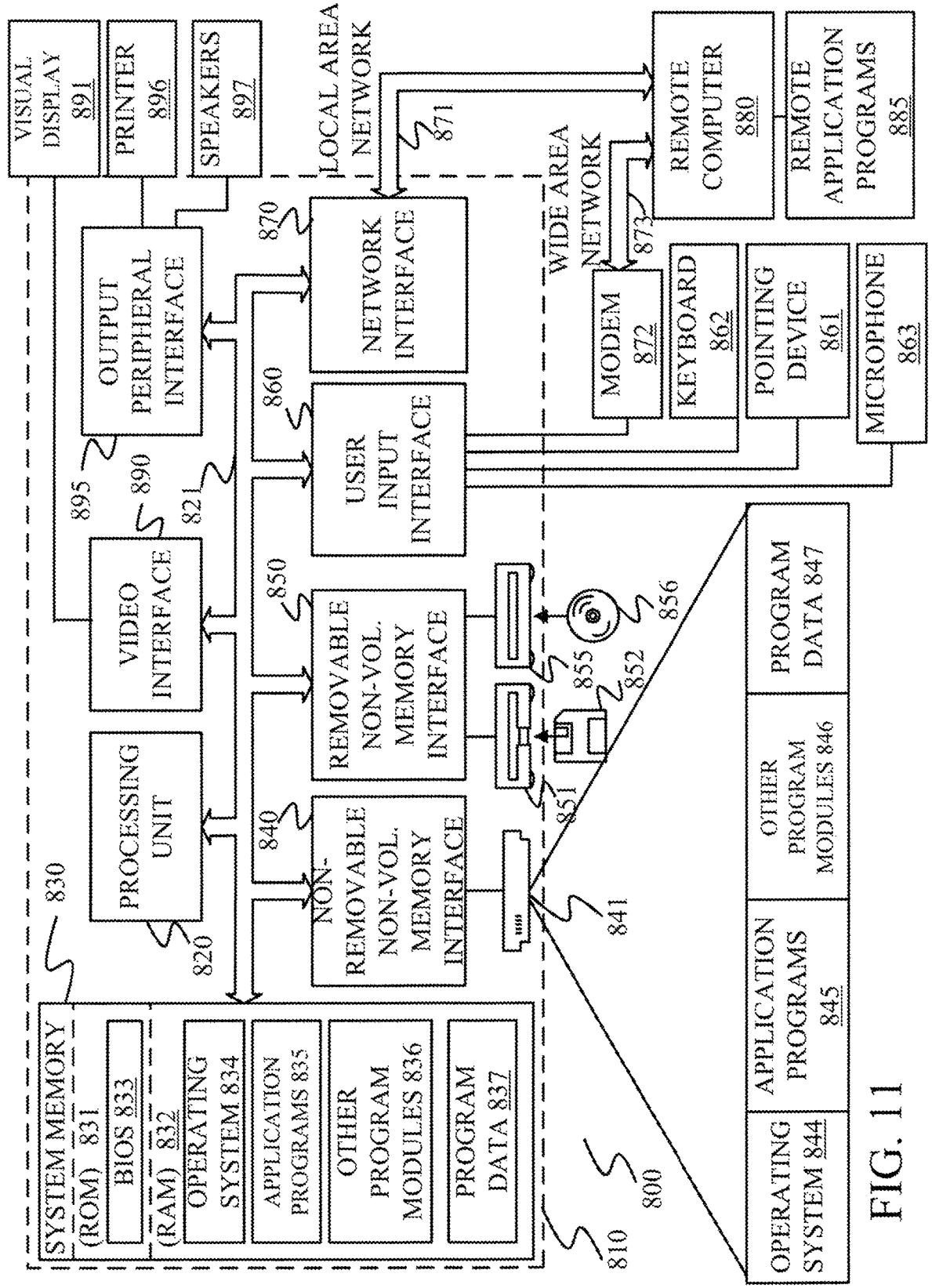
FIG. 11 is a block diagram of one embodiment of a computing environment.

FIG. 11 is one embodiment of a computing environment in which system 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 110), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer-implemented method, comprising:

generating a user interface display, within an application context of an application, on a client device;

receiving, at the client device, a metadata representation of a dialog;

generating a dialog display based on the metadata representation; and rendering the dialog on the user interface display, within the application context.

Example 2 is the computer-implemented method of any or all previous examples wherein receiving, at the client device, a metadata representation, comprises:

exposing a dialog application programming interface (API) that receives input parameters through the user interface display of the application, the input parameters defining dialog content and data bound to the dialog; and providing, through the API, results obtained through the dialog, to the application.

Example 3 is the computer-implemented method of any or all previous examples wherein the application comprises a business application and wherein generating a user interface display comprises:

generating a user interface display in the business application.

Example 4 is the computer-implemented method of any or all previous examples wherein receiving a metadata representation of the dialog comprises:

receiving control metadata identifying controls that are included on the dialog.

Example 5 is the computer-implemented method of any or all previous examples wherein receiving a metadata representation of the dialog comprises:

receiving data binding metadata indicative of data sources bound to the controls on the dialog.

Example 6 is the computer-implemented method of any or all previous examples wherein receiving a metadata representation comprises:

receiving business logic metadata identifying business logic to be run on the dialog.

Example 7 is the computer-implemented method of any or all previous examples wherein receiving a metadata representation comprises:

receiving a markup language representation of the dialog.

Example 8 is the computer-implemented method of any or all previous examples wherein receiving a markup language representation of the dialog comprises:

receiving an XML representation of the dialog.

Example 9 is a computer-implemented method, comprising:

generating a dialog definition user interface display with user input mechanisms actuated to define a dialog for display on a parent page within a computer system;

receiving user actuation of the user input mechanisms; and generating a metadata definition of the dialog based on the user actuation of the user input mechanisms.

Example 10 is the computer-implemented method of any or all previous examples wherein generating a dialog definition user interface display comprises:

displaying a set of dialog type selection user input mechanisms actuated to define a dialog type.

Example 11 is the computer-implemented method of any or all previous examples wherein generating a dialog definition user interface display comprises:

receiving user actuation of a given dialog type selection user input mechanism; and in response to the user actuation, displaying configuration displays with user configuration input mechanisms actuated to configure a dialog of a type corresponding to the given dialog type.

Example 12 is the computer-implemented method of any or all previous examples wherein generating a dialog definition user interface display comprises:

displaying a set of control selection user input mechanisms actuated to select a control on the dialog.

Example 13 the computer-implemented method of any or all previous examples wherein generating a dialog definition user interface display comprises:

displaying a business logic definition display with user input mechanisms actuated to define business logic run on the dialog.

Example 14 is the computer-implemented method of any or all previous examples wherein generating a dialog definition user interface display comprises:

displaying a data binding display with user input mechanisms actuated to identify data bindings to the dialog.

Example 15 is a computer system, comprising:

a dialog definition system that receives user inputs and generates metadata definitions of dialogs to be rendered in an application in the computer system based on the user inputs;

a user interface component that receives a request to render a dialog and provides a metadata definition of the dialog, the user interface component sending parameters for the dialog to a rendering component through an application programming component (API) and receiving results from the dialog through the API; and a computer processor that is a functional part of the computer system and is activated by the dialog definition system and the user interface component to facilitate generating metadata definitions, sending parameters and receiving results.

Example 16 is the computer system of any or all previous examples wherein the application comprises a business application.

Example 17 is the computer system of any or all previous examples wherein the dialog definition system displays a dialog definition user interface display with dialog definition user input mechanisms that are actuated to provide the user inputs.

Example 18 is the computer system of any or all previous examples wherein the dialog definition user input mechanisms comprise business logic user input mechanisms that receive user inputs defining business logic that is run on the dialog.

Example 19 is the computer system of any or all previous examples wherein the dialog definition user input mechanisms comprise control definition user input mechanisms that receive user inputs defining controls on the dialog.

Example 20 is the computer system of any or all previous examples wherein the dialog definition user input mechanisms comprise data binding user input mechanisms that receive user inputs defining data sources bound to the dialog.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a client computing device, the method comprising:
    generating a user interface display within an application context of an application;
    receiving a metadata representation that:
        defines a control layout associated with a control on a dialog, and
        comprises logic metadata identifying logic executable on the dialog;
    based on the metadata representation, generating the dialog that:
        comprises the control in accordance with the control layout,
        includes dialog content and data bound to the dialog based on an input parameter that corresponds to the application context and is received through a dialog application programming interface (API) associated with the dialog, and
        is rendered within the application context such that the dialog overlays at least a portion of the user interface display;
    receiving an indication of a user input associated with the dialog rendered within the application context; and
    generating an output parameter by executing the logic based on the user input, the output parameter being received from the dialog through the dialog API.

2. The method of claim 1, and further comprising:
    receiving the input parameter from the application; and
    providing the output parameter to the application.

3. The method of claim 1, wherein the user interface display comprises an application page associated with the application.

4. The method of claim 1, wherein the logic performs user interface functionality of the dialog.

5. The method of claim 1, wherein the metadata representation comprises data binding metadata indicative of a data source bound to the control on the dialog.

6. The method of claim 1, wherein receiving a metadata representation comprises:
    receiving the metadata representation from a computing system that is remote from the client computing device.

7. The method of claim 1, wherein the metadata representation comprises a markup language representation of the dialog.

8. The method of claim 7, wherein the markup language representation comprising an XML representation of the dialog.

9. A computing system comprising:
    a processor; and
    memory storing instructions executable by the processor, wherein the instructions configure the computing system to:
        obtain a metadata definition that defines a control layout associated with a control on a dialog and logic to be executed on the dialog, the dialog being associated with an application page of an application having an application context;
        based on the metadata definition, generate the dialog that:
            comprises the control in accordance with the control layout,
            includes dialog content and data bound to the dialog based on an input parameter that corresponds to the application context and is received through a dialog application programming interface (API) associated with the dialog, and
            is rendered within the application context such that the dialog overlays at least a portion of the parent page;
        receive an indication of a user input associated with the dialog; and
        generate an output parameter indicative of logic executed on the dialog based on the user input, the output parameter being received from the dialog through the dialog API.

10. The computing system of claim 9, wherein the instructions configure the computing system to:
    receive the input parameter from the application; and
    provide the output parameter to the application.

11. The computing system of claim 9, wherein the application page comprises a parent page associated with the application.

12. The computing system of claim 9, wherein the logic performs user interface functionality of the dialog.

13. The computing system of claim 9, wherein the metadata representation comprises data binding metadata indicative of a data source bound to the control on the dialog.

14. The computing system of claim 9, wherein the metadata representation is received from a remote system that is remote from the computing system.

15. The computing system of claim 9, wherein the metadata representation comprises a markup language representation of the dialog.

16. The computing system of claim 15, wherein the markup language representation comprising an XML representation of the dialog.

17. A computing system comprising:
a processor; and
memory storing instructions executable by the processor, wherein the instructions configure the computing system to:
receive a request to render a dialog within an application context of an application, the request being associated with a client device;
send, to the client device, a metadata representation that defines a control layout associated with a control on the dialog and includes logic metadata identifying logic executable on the dialog;
based on the request,
send, through a dialog application programming interface (API) associated with the dialog, an application parameter corresponding to the application context; and
receive, through the API, a result that is indicative of the logic executed on the dialog based on the application parameter.

18. The computing system of claim 17, wherein the instructions configure the computing system to:
generate a representation of a dialog definition user interface display comprising a dialog type selection user input mechanism;
receive an indication of user actuation of the dialog type selection user input mechanism;
based on the indication of user actuation of the dialog type selection user input mechanism, select a dialog type from a plurality of dialog types; and
generate the metadata definition based on the selected dialog type.

19. The computing system of claim 17, wherein the metadata representation comprises data binding metadata indicative of a data source bound to the control on the dialog.

20. The computing system of claim 18, wherein the representation of the dialog definition user interface display comprises a control selection user input mechanism, a logic definition user input mechanism, and a data binding user input mechanism, and wherein the instructions configure the computing system to:
based on an indication of user actuation of the control selection user input mechanism, select the control and define the control layout;
based on an indication of user actuation of the logic definition user input mechanism, generate the logic metadata; and
based on an indication of user actuation of the data binding user input mechanism, generate the data binding metadata.

* * * * *